United States Patent Office 3,490,441
Patented Jan. 20, 1970

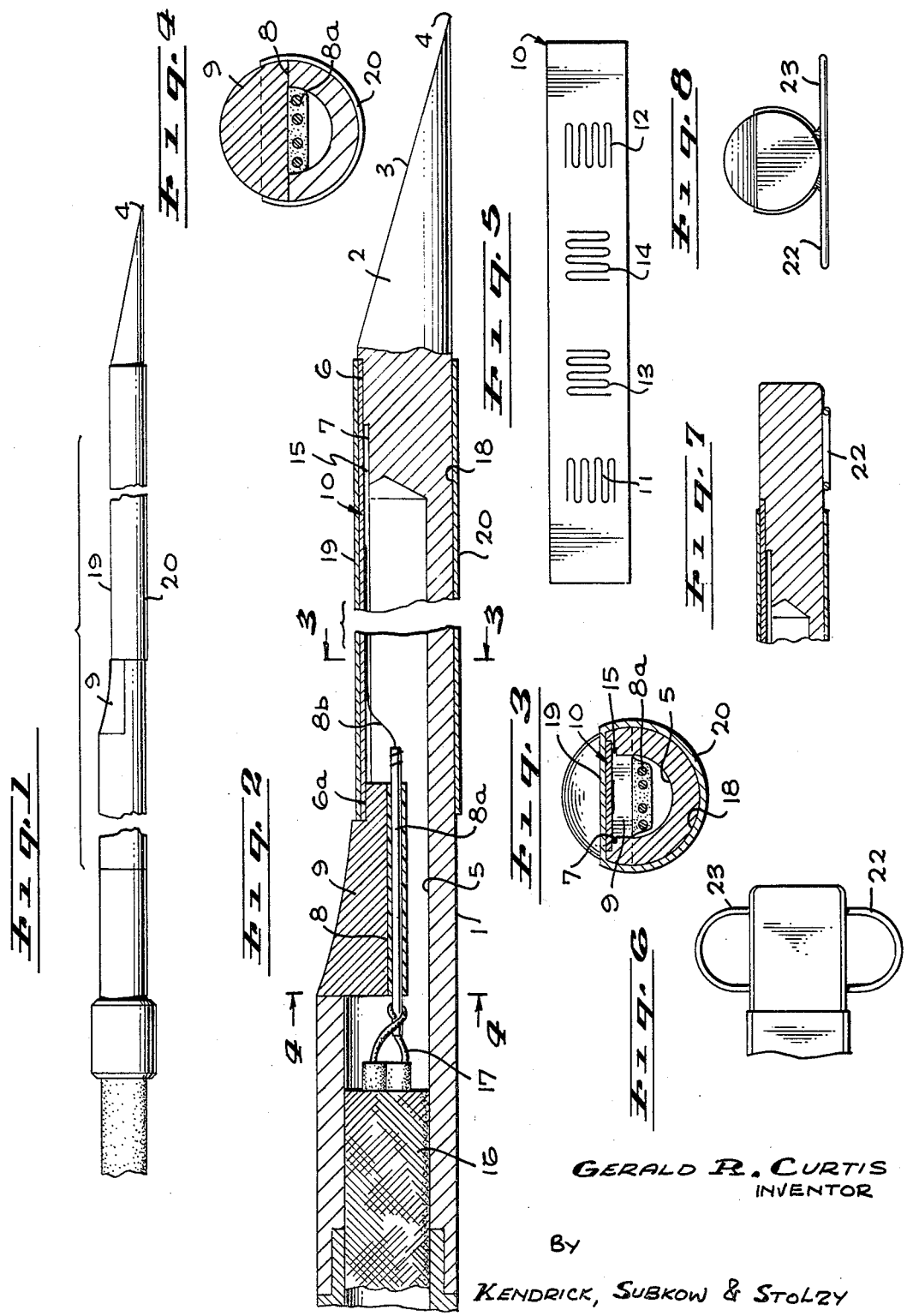

3,490,441
INTRA-ARTERIAL BLOOD PRESSURE TRANSDUCERS
Gerald R. Curtis, Ojai, Calif., assignor to Statham Instruments, Inc., Los Angeles, Calif., a corporation of California
Filed Jan. 10, 1966, Ser. No. 519,511
Int. Cl. A61b 5/02
U.S. Cl. 128—2.05       4 Claims

ABSTRACT OF THE DISCLOSURE

A hollow tubular member of dimensions suitable to permit receipt within, say, an artery, includes within its bore a thin, flat beam carrying a set of strain gages connected as a Wheatstone bridge. A portion of the tubular side wall is removed immediately opposite the beam. A thin metal sheath is received onto the tubular member and parts of which are formed to engage the beam through the opening in the member side wall. Fluid pressure deforms the sheath, deflecting the beam and thereby producing corresponding variations in the electrical resistance of the bridge gages. Externally located monitoring apparatus renders the bridge resistance variation in fluid pressure terms.

---

This invention relates to intra-arterial blood pressure transducers which can be made small enough, for example, to insert into a vein or artery or into the heart, the eyeball or the brain.

It has for its object the design of such a blood pressure transducer which has a suitable frequency response and which does not have to be infused periodically with anti-coagulant solutions, as is required in my prior art devices.

In one form it can also be used as a chronic implant in the heart or brain or eyeball.

In another form it can be used as a needle pressure transducer to be inserted through the flesh without forming a surgical opening through the body, for introduction of the transducer into the circulatory system.

The transducer is in a general sense a tube from which a section of the wall has been milled. The missing section is replaced with a beam held on its ends so it is free to deflect inwardly when an external force is imposed upon the beam. A thin metallic sheath is then slipped over the the entire unit to act as a force collector device.

The deflection of the beam is detected by bonded filaments or deposited filaments or other strain gages connected to the underneath side of the beam. This construction permits it to be made in very small sizes, and in one version it has been made 0.035 inch in diameter by .240 inch long. This miniature transducer can be used inside the body either by going through the flesh, as in the case of the needle form, or into the artery or vein. It may be used as an implant in the heart, brain, eyeball or other part of the body.

Since the transducer has no orifices through which the blood passes, it can be used without fear of clotting of the blood which frequently occurs in passing through orifices. The transducer of my invention, therefore, does not need to have provisions made for passage of anticoagulant material to prevent such clotting or solutions to be used for clearing the transducer after clotting occurs.

These and other objects of my invention are further described by reference to the drawings, which illustrate forms of my invention which I now contemplate to be the best mode of making my invention for the various uses as described herein, in which:

FIG. 1 shows a side elevation of one form of my invention;

FIG. 2 is a transverse section partly in elevation of FIG. 1;
FIG. 3 is a section taken on line 3—3 of FIG. 2;
FIG. 4 is a section taken on line 4—4 of FIG. 2;
FIG. 5 is a plan view of a flexible beam;
FIG. 6 shows a modification of the end of the tube 1;
FIG. 7 shows a cross-sectional view of FIG. 6 for use of the device as a chronic implant; and
FIG. 8 is an end view of FIG. 7.

Referring to FIGS. 1 through 4, the rod 1 is bored with a bore 5 part way through the end to form a tube with a solid end 2 which is reduced at 3 to form a needle point 4. The tube thus produced is milled to form a longitudinal and transverse notch, to form steps at 6. A second notch is milled extending longitudinally of the axis of the bores presenting two parallel surfaces 7 (see FIG. 3). At one end of the surfaces 7 the bore 5 is notched at 8, and an insert 9 is positioned on the notch 8. The insert 9 is stepped with a step 6a which is at the same elevation as 6. Underneath the insert 9 are mounted four electrical connectors 8a suitably insulated from each other and from the insert 9 by suitable insulation, for example, an encapsulating plastic. The connectors are exposed at each end, as shown in FIG. 1.

The thin flexible beam 10, whose length is greater than its width, is mounted on and rigidly connected to the steps 6 and 6a and firmly secured by adhesive or by welding or soldering to the steps 6 and 6a. It is spaced at 15 from both of the longitudinally extending surfaces 7 between the ends of said beam.

Underneath the beam 10 are mounted four filament gages which may be either the bonded wire type or film type, or may be deposited grids made by procedures now conventional in this art. They are arranged so that two gages 11 and 12 extend along the length of the beam and two gages 13 and 14 extend across the width of the beam. The gages are positioned along the beam adjacent the spaces 15. These are connected into Wheatstone bridge arrangement by connection to the electrical connectors 8a by connectors 8b. The connectors 8a are in turn connected to the electrical leads 17 and the catheters attached to the transducer.

The catheters are ones which are conventionally used in intra-cardiac transducers, for example such as illustrated in the Warnick Patent No. 2,981,911. The catheter may be used to seal the end of the bore 5 opposite the end 2.

A sheath formed of a cylindrical portion 20 and a flat portion 19, either integrally formed or secured together as shown in the transverse section of FIG. 3, is slipped over the tube formed from the rod 1 so that the portion 19 is in physical contact with the beam 10, with one end in the notch 6 and the other in the notch 6a. A cementitious material is inserted at 18 to secure the insert 9 and the sheath, to hold them rigidly in position.

This transducer may be employed by merely inserting the point 4 into the body at the desired location to intercept any blood vessel. The pressure of the blood exteriorly of the sheath 19 will deflect the sheath 19 to cause deflection of the diaphragm beam 10. This causes the strain gages 11 and 12 to be placed in tension, while the tension in 13 and 14 will be sensibly unchanged. As is conventional, this change in tension will result in an electrical signal where the gages are connected as a Wheatstone bridge and electrically energized, which will be proportional to the blood pressure. The resistors 13 and 14 are used for the purpose of temperature compensation, as will be understood by those skilled in the art.

For purposes of insertion into and through the arteries and even into the heart, the needle point is not desirable. For such purposes I use a blunt end, as shown in FIG.

6. This transducer can also be implanted in any desired position. For such use I provide the loops 23 and 22, as shown in FIG. 7, cemented by a resin, for example, an epoxy resin, as shown in FIG. 8, to permit the sewing of the transducer in position at the desired location.

While I have described particular embodiments of my invention for the purpose of illustration, it should be understood that various modifications and adaptations thereof may be made within the spirit of the invention, as set forth in the appended claims.

I claim:

1. An intra-arterial pressure transducer, comprising: a hollow tube having at least one closed end of dimensions permitting recept within the artery, the side walls of said tube including portions defining an opening therein; a thin-walled beam mounted in the wall portions defining said opening and rigidly connected to said tube at the ends of said beam; strain gages mounted on a major surface of said thin wall beam facing the tube bore; and a flexible sheath received onto said tube and in covering relationship to the opening, said sheath being secured to said tube in a fluid-tight relation; said sheath having a portion located opposite the opening of said tube formed to contact the outwardly directed major surface of said beam whereby blood pressure within the artery acts upon the sheath and thence the beam producing corresponding modifications of the strain gages electrical characteristics.

2. The transducer of claim 1, in which the closed end of the tube is the forward end, which end is sharpened, permitting its ready insertion through the artery wall.

3. The transducer of claim 1, in which the major longitudinanl extent of the tube has circular cross section with a flattened side on which the opening is located, and said sheath is of similar geometry permitting mating receipt onto the tube in a fitting relationship.

4. The transducer of claim 1, in which the tube side wall portions defining the opening include outwardly directed notches for receiving the ends of said beam therein.

References Cited

UNITED STATES PATENTS

| | | | |
|---|---|---|---|
| 2,634,721 | 4/1953 | Greenwood | 128—2.05 |
| 2,720,113 | 10/1955 | Statham | 73—398 |
| 3,078,841 | 2/1963 | Brownson | 128—2.05 |

WILLIAM E. KAMM, Primary Examiner